United States Patent
Mitsuhashi et al.

(10) Patent No.: US 12,328,481 B2
(45) Date of Patent: Jun. 10, 2025

(54) INFORMATION COMMUNICATION TERMINAL DEVICE AND METHOD FOR CONTROLLING DISPLAY IN SAID DEVICE

(71) Applicant: INFOCITY, Inc., Tokyo (JP)

(72) Inventors: Takamichi Mitsuhashi, Tokyo (JP); Toshihide Hayashi, Tokyo (JP); Gota Iwanami, Tokyo (JP)

(73) Assignee: INFOCITY, INC., Tokyo (JP)

( * ) Notice: Subject to any disclaimer, the term of this patent is extended or adjusted under 35 U.S.C. 154(b) by 364 days.

(21) Appl. No.: 17/758,953

(22) PCT Filed: Jan. 15, 2021

(86) PCT No.: PCT/JP2021/001228
§ 371 (c)(1),
(2) Date: Jul. 15, 2022

(87) PCT Pub. No.: WO2021/145421
PCT Pub. Date: Jul. 22, 2021

(65) Prior Publication Data
US 2023/0345081 A1    Oct. 26, 2023

(30) Foreign Application Priority Data
Jan. 16, 2020    (JP) .................................. 2020-005525

(51) Int. Cl.
*H04N 5/445* (2011.01)
*H04N 21/414* (2011.01)
(Continued)

(52) U.S. Cl.
CPC ..... *H04N 21/482* (2013.01); *H04N 21/41407* (2013.01); *H04N 21/42224* (2013.01); *H04N 21/4316* (2013.01); *H04N 21/472* (2013.01)

(58) Field of Classification Search
CPC .......... H04N 21/482; H04N 21/41407; H04N 21/42224; H04N 21/4316; H04N 21/472;
(Continued)

(56) References Cited

U.S. PATENT DOCUMENTS 7,577,973 B1 * 8/2009 Kapner, III ............ H04N 21/84
725/39
9,426,513 B2 * 8/2016 Jang .................. H04N 21/43074
(Continued)

FOREIGN PATENT DOCUMENTS

| | | |
|---|---|---|
| JP | 2011049896 A | 3/2011 |
| JP | 2017188910 A | 10/2017 |
| WO | 2015181906 A1 | 12/2015 |

OTHER PUBLICATIONS

International Search Report issued in International Application No. PCT/JP2021/001228, mailed Mar. 30, 2021 (5 pages).
(Continued)

*Primary Examiner* — Benjamin R Bruckart
*Assistant Examiner* — Sahar Aqil Riaz
(74) *Attorney, Agent, or Firm* — OSHA BERGMAN WATANABE & BURTON LLP

(57) ABSTRACT

An information communication terminal device adapted for an IPTV service that delivers program data from one of a plurality of delivery servers via a communication network includes a channel selection unit, a program data acquisition unit, and a display control unit. The channel selection unit selects a channel number according to channel allocation which defines allocation of channels corresponding to broadcasting regions. The program data acquisition unit requests a specific delivery server to deliver program data according to link information associated with the selected channel number and acquires the program data delivered from the specific delivery server in response to the request. The display control unit performs control such that program
(Continued)

content is displayed on a screen based on the received program data. In response to a first operation by a user with respect to the screen, the channel selection unit determines a channel number of a first switching destination according to the channel allocation. The program data acquisition unit acquires first program data delivered from a specific delivery server according to link information associated with the current channel number, while, in response to a second operation, subsequent to the first operation, with respect to the screen, the program data acquisition unit starts acquiring second program data delivered from a specific delivery server according to link information associated with the determined channel number of the first switching destination. The display control unit performs control such that first program content based on the first program data and second program content based on the second program data are displayed on the screen.

9 Claims, 12 Drawing Sheets

(51) Int. Cl.
*H04N 21/422* (2011.01)
*H04N 21/431* (2011.01)
*H04N 21/472* (2011.01)
*H04N 21/482* (2011.01)

(58) Field of Classification Search
CPC .......... H04N 21/64322; H04N 21/6125; G06F 3/0485; G06F 3/0488
USPC .......................................................... 725/56
See application file for complete search history.

(56) References Cited

U.S. PATENT DOCUMENTS

| | | | |
|---|---|---|---|
| 2012/0159554 A1* | 6/2012 | Bennett | H04N 21/234354 725/56 |
| 2015/0128046 A1* | 5/2015 | Cormican | H04N 21/42224 715/720 |
| 2018/0026281 A1 | 1/2018 | Son | |
| 2018/0262812 A1 | 9/2018 | Chai et al. | |

OTHER PUBLICATIONS

Written Opinion issued in International Application No. PCT/JP2021/001228; Dated Mar. 30, 2021 (4 pages).
Office Action issued in Korean Application No. 10-2022-7024079, mailed May 30, 2024 (11 pages).

* cited by examiner

Figure 5

| | REMOTE CONTROL NO. | 1 | 2 | 3 | 4 | 5 | 6 | 7 | 8 | 9 | 10 | 11 | 12 |
|---|---|---|---|---|---|---|---|---|---|---|---|---|---|
| HOKKAIDO | | BB BROADCASTING | AA E-TV | AA GENERAL | | CC BROADCASTING | BB BROADCASTING | TV EE | FF BROADCASTING | | | | |
| | SAPPORO | 19 | 13 | 15 | | 21 | 23 | 14 | 25 | | 10 | | |
| | | http://.. | http://.. | | | http://.. | http://.. | http://.. | http://.. | | | | |
| | .. | .. | .. | .. | .. | .. | .. | .. | .. | .. | .. | | |
| | .. | .. | .. | .. | .. | .. | .. | .. | .. | .. | .. | | |
| | REMOTE CONTROL NO. | 1 | 2 | 3 | 4 | 5 | 6 | 7 | 8 | 9 | 10 | 11 | 12 |
| TOKYO | | AA GENERAL | AA E-TV | | GG TV | TV HH | TV II | TV JJ | KK TV | TOKYO LL | | | BROADCASTING MM |
| | TOKYO SkyT | 27 | 26 | | 25 | 24 | 22 | 23 | 21 | 16 | | | 28 |
| | | http://.. | http://.. | | http://.. | http://.. | http://.. | http://.. | http://.. | http://.. | | | http://.. |
| | .. | .. | .. | .. | .. | .. | .. | .. | .. | .. | .. | | |
| | .. | .. | .. | .. | .. | .. | .. | .. | .. | .. | .. | | |

INFORMATION COMMUNICATION TERMINAL DEVICE AND METHOD FOR CONTROLLING DISPLAY IN SAID DEVICE

TECHNICAL FIELD

The present invention relates to information communication terminal devices and methods for controlling display on such devices, and in particular to an information communication terminal device that allows program content provided over communication networks to be viewed and a method for controlling display therein.

BACKGROUND ART

Conventionally, television broadcasting services have taken a hold in society, wherein viewers receive broadcasting of program content from broadcasting stations with terminal devices such as television receivers, set-top boxes, and smart phones with built-in reception tuners, and then view the program content. More recently, there has been increasing popularity of IPTV services (sometimes referred to as "Internet broadcasting services") which allow viewers to view, on terminal devices, program content that is streamed or delivered through communication networks, such as an IP network, from an Internet Service Provider (ISP) or Content Distribution Network (CDN) provider. An IP broadcasting service and an IP retransmission service are known as such IPTV services. An IP broadcasting service is a service based on a concept of channels in which programs are scheduled along a time axis, as with the conventional television services, and it allows program content on various channels to be viewed using communication networks. Also, an IP retransmission service can provide a service similar or equivalent to existing terrestrial digital broadcasting, BS digital broadcasting, CS digital broadcasting, and the like, using communication networks. Such an IPTV service allows the same services as terrestrial digital broadcasting and the like to be provided by connecting a viewing terminal device (with or without a tuner) to the Internet instead of an antenna, even in places where radio waves of terrestrial digital broadcasting and the like are difficult to receive.

In such IPTV services, video/voice data relating to program content and their related information are typically delivered to viewers using respectively different delivery schemes. More specifically, video/voice data is delivered under Real Time Streaming Protocol (RTSP) based on IP multicast technology, whereas information related thereto is often delivered under HTTP. For this reason, IPTV services require technology to display video/voice data and its related information, as program content, in a synchronized manner at a predetermined timing on a viewer's terminal device.

For example, Patent Document 1 discloses a reproduction technology that reproduces data, such as subtitles, that is transmitted separately from video content data in synchronization with the video content data, in a broadcasting retransmission service that retransmits conventional television broadcasting using a communication network.

Meanwhile, in digital terrestrial broadcasting, the viewable range (i.e., the broadcasting range or broadcasting region) is largely dependent on the distance over which the broadcast waves output from a radio tower can reach, and the broadcasting stations (channels) that can be selected are determined by the place of residence or current location of the viewer. Currently, viewers pre-register selectable broadcasting stations by entering and registering the setting, such as the postal code, address, etc., into the television receiver. Therefore, if a viewer uses a mobile terminal device such as a smartphone to receive an IP retransmission service correspondent to digital terrestrial broadcasting, such a terminal device needs to recognize a broadcasting station which covers a current location of the viewer in its broadcasting region.

Patent Document 2 discloses a technology that allows a user of a broadcasting receiver to select a desired IP-type broadcasting from among multiple IP-type broadcastings, while IP-type broadcastings output from the broadcasting receiver is limited to an IP-type broadcasting of a broadcasting station which covers a current location of the broadcasting receiver in its broadcasting range.

PRIOR ART DOCUMENTS

Patent Documents

Patent Document 1: Japanese Patent Publication No. 2017-188910

Patent Document 2: Japanese Patent Publication No. 2011-049896

SUMMARY OF THE INVENTION

Problems to be Solved by the Invention

In a quest to make the IPTV service become similar or equivalent to the digital terrestrial broadcasting service, etc., it is expected that viewing style of viewers (users) will shift from stationary-type television receivers up to now to mobile-type information communication terminal devices such as smartphones. At present, however, no user-friendly information communication terminal device that takes the IPTV service into consideration has been proposed.

In conventional digital terrestrial broadcasting, etc., the viewer (user) selects a numerical button, corresponding to a channel number (channel code), arranged on a remote controller (commonly referred to as a "remote control") adjunct to a television receiver or sequentially selects one of channel numbers by pressing down a channel button in order to switch the program (channel) being viewed on the television receiver screen. Once a new channel is selected, the television receiver receives the broadcast wave signals of the new channel by matching a tuner frequency to the frequency corresponding to the channel, descrambles the signals with a decoder, further converts the signals into video/audio signals, and then displays the program content of the selected channel number on the screen.

However, the conventional television receiver is configured with one tuner assigned to one channel selected (e.g., even for a television receiver with multiple tuners for recording all programs, it is configured with one tuner per program). Therefore, it takes about 0.5 to 1 second to display, on the screen, program content based on the broadcast wave signal of the switching destination channel. Specifically, in the standard for conventional digital terrestrial broadcasting, etc., the television receiver needs to receive signals (stream signals) carried along the time axis for a predetermined time unit in order to reproduce or restore the video for viewing, and there was therefore inconvenience that the program content could not be immediately displayed. As a consequence, the conventional television receiver has withstood the time between channel switching and video reproduction by, for example, displaying the full screen in black (i.e., no display) or by displaying the channel number and/or program name and the like on the screen. For many years, such a state of the screen display during channel switching has been left unsolved with a recognition shared among viewers themselves that such a state is understandable, despite the fact that such a state is actually stressful for the viewers.

As such, an object of the present invention is to provide an information communication terminal device and a method for controlling display on such device, which bring about a new concept of screen display during channel selection or switching which is completely different from conventional television broadcasting.

More specifically, one of the objects of the present invention is to provide an information communication terminal device and a method for controlling display on such device, which eliminate the inconvenience of the program content of the switching destination channel not being immediately displayed on the screen when the channel being viewed by a user is selected or switched.

Further, one of the objects of the present invention is to provide an information communication terminal device and a method for controlling display on such device, which display the screen switching from the currently viewed program content to the switching destination program content in a smooth or continuous manner.

Means for Solving the Problems

The present invention for solving the above-described problems is configured to include the matters specifying the invention or technical features indicated below.

The present invention according to an aspect is an information communication terminal device adapted for an IPTV service that delivers program data from one of a plurality of delivery servers via a communication network. The information communication terminal device may comprise: a channel selection means which selects a channel number according to channel allocation which defines allocation of channels corresponding to broadcasting regions; a program data acquisition means which requests a specific delivery server to deliver program data according to link information associated with the selected channel number and acquires the program data delivered from the specific delivery server in response to the request; and a display control means which performs control such that program content is displayed on a screen based on the received program data. In response to a first operation by a user with respect to the screen, the channel selection means determines a channel number of a first switching destination according to the channel allocation. The program data acquisition means acquires first program data delivered from a specific delivery server according to link information associated with the current channel number, while, in response to a second operation, subsequent to the first operation, with respect to the screen, the program data acquisition means starts acquiring second program data delivered from a specific delivery server according to link information associated with the determined channel number of the first switching destination. The display control means performs control such that first program content based on the first program data and second program content based on the second program data are displayed on the screen.

The first operation may be a touch operation or a tap operation by the user on the screen, and the second operation may be an operation with movement in a predetermined direction within the screen. The second operation may also be at least one of a swipe operation, a flick operation, or a scroll operation, with respect to the screen.

The display control means may perform control such that switching from the first program content to the second program content is displayed in a smooth manner on the screen in response to the movements in the second operation.

Further, the display control means may perform the switching from the first program content to the second program content on the screen by screen scrolling in the predetermined direction.

If the first operation is a multi-touch operation on the screen, the channel selection means may determine, in response to the multi-touch operation, a channel number of a second switching destination different from the channel number of the first switching destination according to the channel allocation.

In response to the second operation, subsequent to the multi-touch operation, with respect to the screen, the program data acquisition means may request delivery of third program data according to link information associated with the determined channel number of the second switching destination, and may start acquiring the third program data delivered from the specific delivery server in response to the request. In this case, the display control means may perform control such that the first program content based on the first program data and third program content based on the third program data are displayed on the screen in association with the reception of the third program data.

A method is provided for controlling display in an information communication terminal device adapted for an IPTV service that delivers program data from one of a plurality of delivery servers via a communication network. The method may comprise: selecting a channel number according to channel allocation which defines allocation of channels corresponding to broadcasting regions; requesting a specific delivery server to deliver program data according to link information associated with the selected channel number; in response to the request, acquiring the program data delivered from the specific delivery server; and performing display control such that program content is displayed on a screen based on the acquired program data. Selecting the channel number includes, in response to a first operation by a user with respect to the screen, determining a channel number of a first switching destination according to the channel allocation. Acquiring the program data includes acquiring first program data delivered from a specific delivery server according to link information associated with the current channel number, while, in response to a second operation, subsequent to the first operation, with respect to the screen, acquiring second program data delivered from a specific delivery server according to link information associated with the determined channel number of the first switching destination. Performing display control includes performing control such that first program content based on the first program data and second program content based on the second program data are displayed on the screen.

Further, the present invention according to another aspect may be a computer program and a non-transitory recording medium having such program stored thereon, for causing a computing device to perform a method for displaying program content based on program data delivered by one of a plurality of delivery servers via a communication network.

In the present disclosure, the term "means" does not merely mean a physical means but also encompasses the case where the functions of such means are achieved by software. In addition, a function of one means may be achieved by two or more physical means, and functions of two or more means may be achieved by one physical means.

Further, in the present disclosure, the term "system" includes an ensemble where multiple devices (or functional modules achieving specific functions) are logically assembled, regardless of whether each device or functional module is physically configured as a single entity or as a separate entity.

Effect of the Invention

The present invention can bring about screen display during channel selection or switching, which is a new concept completely different from conventional television broadcasting.

For example, the present invention allows a so-called "no display state" to be avoided by immediately displaying, on the screen, the program content of the switching destination channel when the channel being viewed by a user is selected or switched.

Other technical features, objects, effects, or benefits of the present invention will become apparent by the following embodiments described with reference to the attached drawings.

BRIEF DESCRIPTION OF THE DRAWINGS

FIG. 5 is a diagram showing an example of a channel allocation information in an information communication terminal device according to an embodiment of the present invention.

DESCRIPTION OF THE EMBODIMENTS

Embodiments of the present invention will be described below with reference to the drawings. However, the embodiments described below are only illustrations, and there is no intention to exclude the application of various variations or technologies not expressly stated below. The present invention may be implemented with various variations (e.g., by combining each embodiment) without deviating from its spirit. In addition, the same or similar parts will be denoted with the same or similar references in the following description of the drawings. The drawings are schematic and do not necessarily correspond to the actual dimensions or ratios. Parts may also be included where the dimensional relationship or ratio between each other is different among the drawings.

Figure 1:
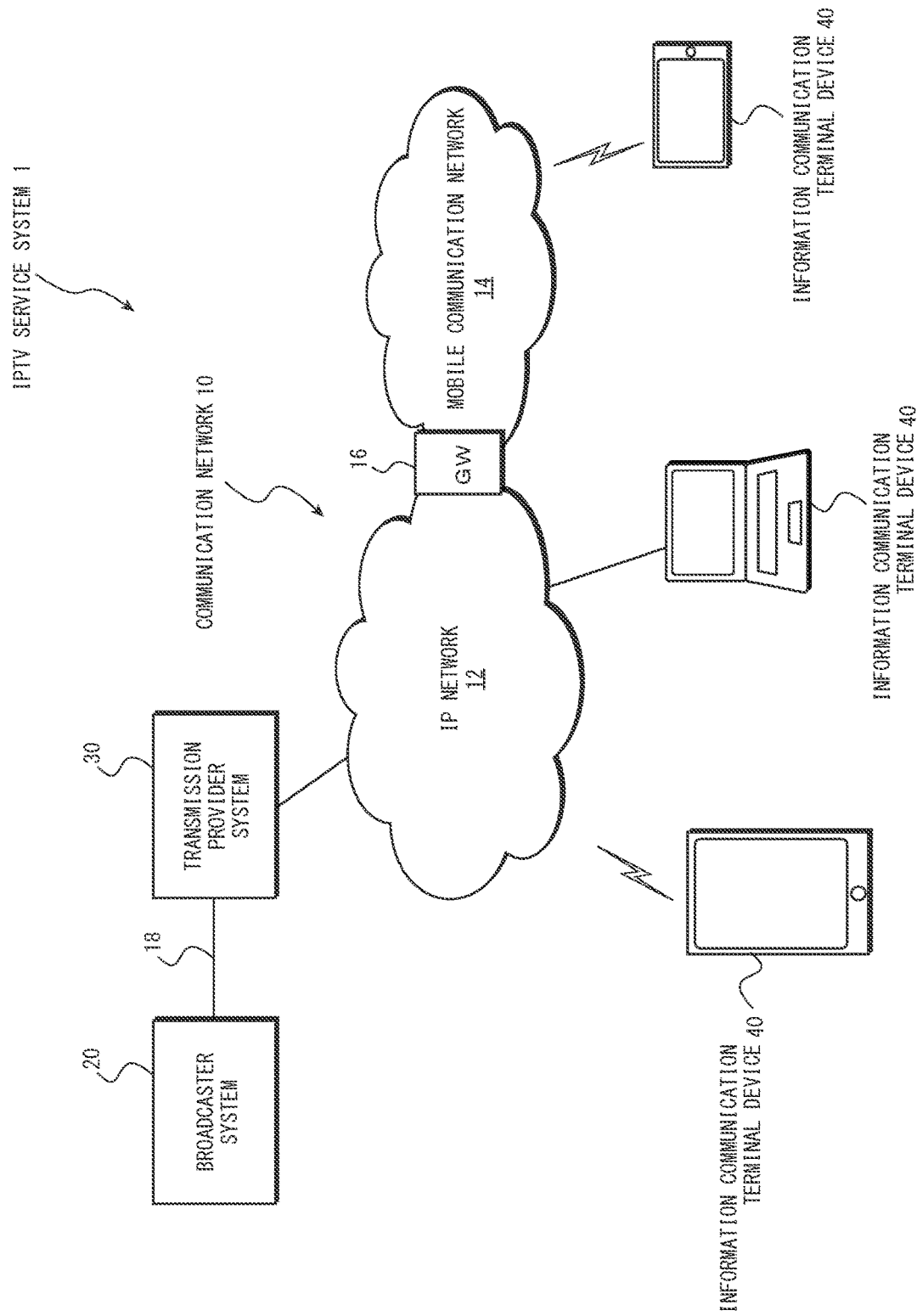
FIG. 1 is a schematic diagram for illustrating an IPTV service scheme according to an embodiment of the present invention.

FIG. 1 is a schematic diagram for illustrating the overall scheme of an IPTV service system according to an embodiment of the present invention. In the present disclosure, the IPTV service refers to a broadcasting service in which program content is streamed or delivered to a viewer (user) over an Internet Protocol (IP)-based network, and is distinguished from the conventional broadcasting service using broadcast waves (e.g., a digital terrestrial broadcasting service). The terms "send" and "deliver" may be synonymous, and they do not exclude words such as "transmit" or "transfer." The IPTV services known at the time of filing the present application include IP broadcasting and IP redelivery. In the present disclosure, the IPTV service system 1 is a system that achieves a broadcasting service in which program content from a broadcasting station is transmitted or delivered to a viewer via an IP-based network. The program content refers to a "program" that is scheduled along a time axis and that is viewed by the viewer, and may contain information related to the program, such as so-called subtitle data and/or data broadcasting data. Program content is configured from, for example, digital data packages or data streams such as videos, images, text and/or audio. For example, the data stream relating to the program content is configured in the "H.264/MPEG-4 AVC" format, which is a high-compression encoding technology. In the present disclosure, the data stream relating to program content may also be referred to as "program data stream" or simply "program data."

As shown in the diagram, a communication network 10 may include the IP-based computer network 12 (hereinafter referred to as the "IP network"), a mobile communication network 14 compliant with mobile communication system standards, and the like. The communication network 10 may include a form of a Content Delivery Network (CDN). In the present disclosure, the communication network 10 is used in a broad concept including the Internet constructed by IP networks, but it is not limited to the IP networks and is not intended to exclude networks of other protocols that allow the delivery of program data. In addition, the communication network 10 may include wireless networks (e.g., Wi-Fi (registered trademark), etc.) constructed by wireless base stations or wireless access points that are not shown. The IP network 12 and the mobile communication network 14 are connected, for example, through a gateway 16, but this is not a limitation.

A broadcaster system 20 may be configured to include broadcasting facilities for performing television broadcasting and radio broadcasting. The broadcaster system 20 is managed and operated by, for example, a broadcaster who has been granted a broadcasting license (e.g., a broadcasting station), but this is not a limitation. Although not shown, the broadcaster system 20 performs, for example, broadcasting services (e.g., digital terrestrial broadcasting) of program content stored on a sending server under control of the automatic operation system. More specifically, the broadcaster system 20 sends out program data according to the programs scheduled along the time axis. For example, this program data may be emitted from a radio tower to a broadcasting-target region as broadcast waves. In addition, the program data may be transmitted to a delivery provider system 30 via, for example, a dedicated line 18.

The program content in the present disclosure may be the same as the program content for broadcasting provided by the conventional broadcasting service, or alternatively, it may be, for example, the program content for broadcasting added with more content. Alternatively, the program content may be different from the program content for broadcasting.

Figure 12:
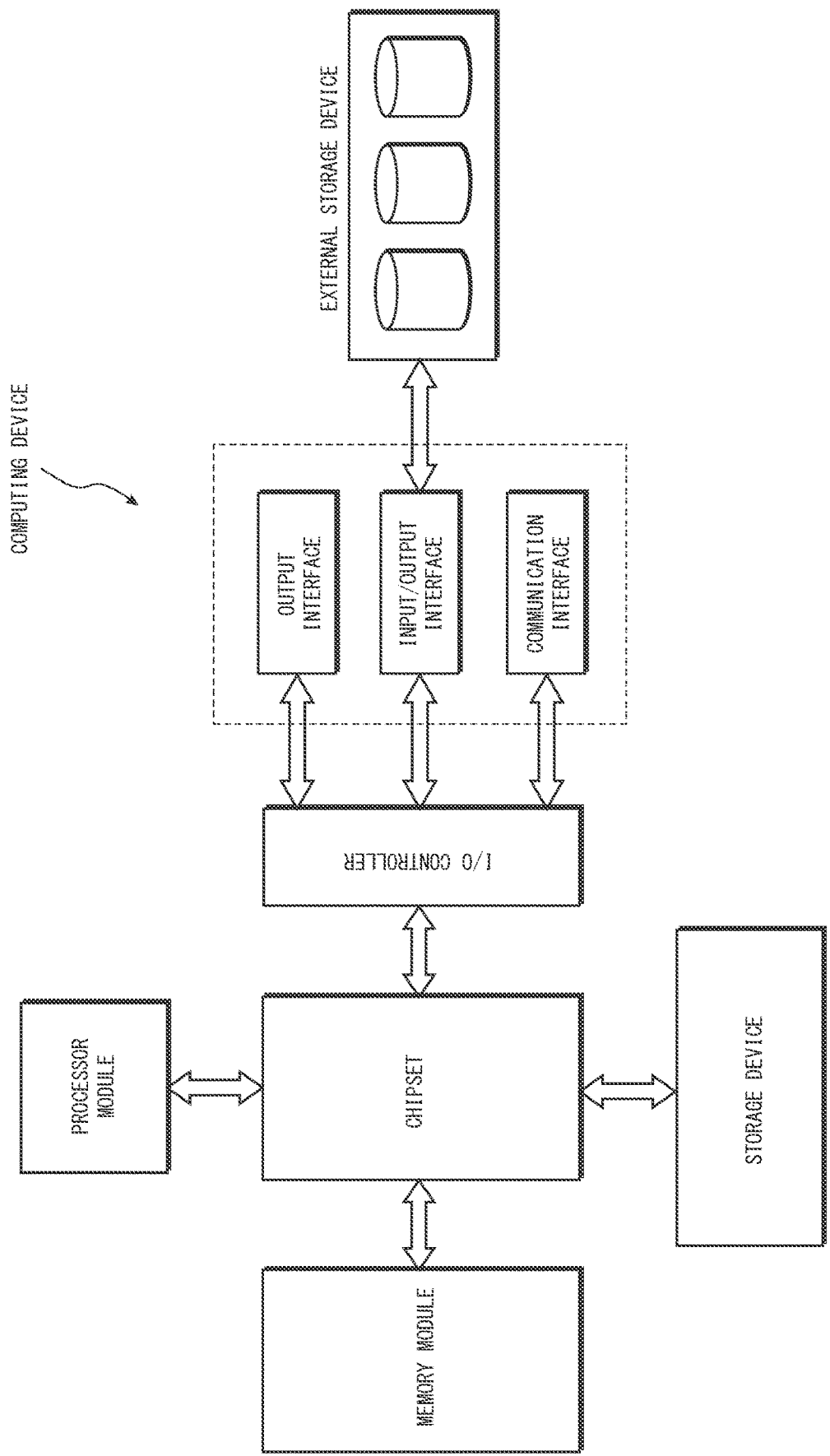
FIG. 12 is a diagram showing an example of a hardware configuration of a delivery server in a delivery provider system according to an embodiment of the present invention.

The delivery provider system 30 may be configured to include a delivery server for delivering program data provided by broadcasters and production companies, etc., to viewers via the communication network 10. The hardware configuration of the delivery server is shown, for example, in FIG. 12, but the details of such configuration are omitted because it is already known. The delivery provider system 30 is managed and operated by, for example, a content delivery provider (CDN provider) and an Internet provider (ISP), but this is not a limitation. Multiple delivery provider systems 30 may be placed, and one delivery provider system 30 may include multiple delivery servers. The program data is provided to the delivery provider system 30 via, for example, a dedicated line or broadcast waves emitted from a radio tower. In preparation for the delivery timing, the delivery provider system 30 may temporarily store the provided program data on the delivery server and may stream the program data according to the program scheduling using, for example, Real Time Streaming Protocol (RTSP) based on IP multicast technology to the viewer's information communication terminal device 40. The program data may be streamed to the information communication terminal device 40 using HTTP long polling or other transmission protocols. In addition, the delivery provider system 30 may deliver data relating to a portion of the program content (e.g., program-related information) and other information (e.g., channel allocation information or EPG information) to the viewer's information communication terminal device 40. Typically, the delivery provider system 30 scrambles and delivers various types of data, including program data, etc.

In the present disclosure, the broadcaster system 20 and the delivery provider system 30 are configured as separate systems; however, the present disclosure is not limited thereto and the broadcaster system 20 may be configured to include the functions of the delivery provider system 30, and vice versa. Further, the delivery provider system 30 may be managed and operated by the broadcaster.

The information communication terminal device 40 is a computing device operated by a user who is a viewer viewing the program, and examples of which include, but not limited to, a desktop computer, a laptop computer, a tablet computer, a smartphone, a feature phone, and other intelligent devices. In the present example, the information communication terminal device 40 is a smartphone that allows for interactive operations via a touch panel or touch screen, and is configured as a viewing terminal device adapted for the program content viewing in the IPTV service, as described below.

More specifically, the information communication terminal device 40 is configured from hardware resources, such as a CPU (processor), a chipset, memory, a communication module, and a user interface, and software resources such as an operating system (which may be configured to include, for example, a kernel, various device drivers, standard libraries, etc.) (hereinafter referred to as the "OS"). The information communication terminal device 40 executes various application programs on the OS under control of the processor, and achieves desired functions. In the present disclosure, the information communication terminal device 40 may be implemented with, for example, an IPTV viewing program, as one of the application programs, that includes modules or a group of instructions for making the information communication terminal device 40 function as a viewer (a so-called viewing terminal device) by means of which programs in the IPTV service can be viewed. Alternatively, the information communication terminal device 40 may be implemented with a browser program, as one of the application programs, and may be configured to achieve the above-described function by way of an add-on program of the browser implemented by the browser program.

The information communication terminal device 40 implemented with the IPTV viewing program receives video/audio data (i.e., program data) relating to the main program content streamed from the delivery provider system 30 according to, for example, the RTSP, and displays the video of the program based on the received program data in real time in a predetermined display area of the screen serving as the user interface and outputs the audio (voice, music, sound effects, etc.) that is synchronized with the video based on the program data. The information communication terminal device 40 displays sub-program content delivered by the delivery provider system 30 according to, for example, the HTTP long polling, either superimposed on the main program content or in a display area separate from the display area for the main program content. The sub-program content may be linked content (complementary or related content) of the main program content, or non-linked content (independent content).

Moreover, the information communication terminal device 40 of the present embodiment sends a request for delivery of channel allocation information to the delivery provider system 30, and retrieves predetermined channel allocation information delivered in response to the request and stores this in a predetermined storage area. The channel allocation information may also be delivered according to, for example, the HTTP long polling, but this is not a limitation. For example, in response to a user operation, the information communication terminal device 40 displays a channel icon or object superimposed on the screen according to the stored channel allocation information.

It should be noted that the information communication terminal device 40 may be a mobile terminal device such as a smartphone as in the present example, but it may also be a computing device in which an input operation can be performed by a pointing device such as a mouse or touch pad, instead of a touch panel.

In the IPTV service system 1 as described above, the user performs a channel switching operation via the user interface while viewing program content of the selected channel on the screen of the information communication terminal device 40. Upon the start of the channel switching operation, the information communication terminal device 40 sends a request for delivery of the program data to the delivery provider system 30 associated with at least one channel that is inferred to be the switching destination, and thereby starts receiving the program data that is inferred to be the switching destination. At this time, the information communication terminal device 40 also receives the program data associated with the channel currently being viewed (i.e., the switching-origin channel) in parallel. The information communication terminal device 40 simultaneously displays the respective program contents based on the program data being received on the user interface screen in real time until the channel switching operation is confirmed.

Although not shown in FIG. 1, the IPTV service system 1 may include an authentication server for authenticating the user (viewer) and/or the information communication terminal device 40 when providing the IPTV services.

Figure 2:
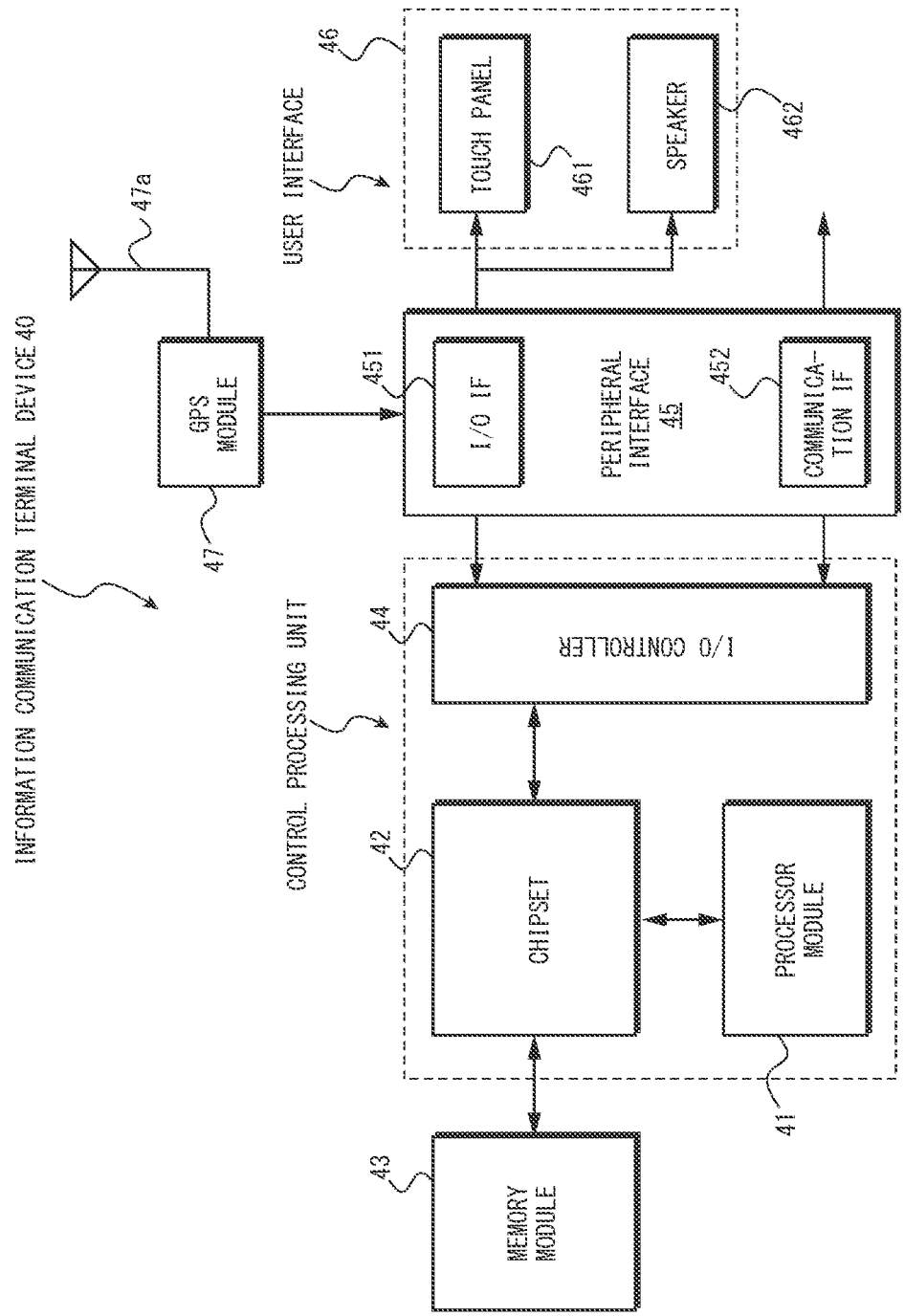
FIG. 2 is a diagram showing an example of a hardware configuration of an information communication terminal device adapted for an IPTV service system according to an embodiment of the present invention.

FIG. 2 is a diagram showing an example of a hardware configuration of the information communication terminal device adapted for the IPTV service system according to an embodiment of the present invention. The diagram shows those hardware resources that are of particular relevance to the present disclosure from among various hardware resources configuring the information communication terminal device 40.

More specifically, as shown in FIG. 2, the information communication terminal device 40 may typically be configured to include one or more processor modules 41, a chipset 42, a memory module 43, an I/O controller 44, various peripheral interfaces 45, and various input/output devices 46. In this example, the information communication terminal device 40 further includes a GPS module 47. Although not shown, the information communication terminal device 40 may include a calling unit that achieves a calling function. For example, the information communication terminal device 40 may accept voice input from the user via the calling unit.

The processor module 41 includes, for example, a processor (processor core), a microcontroller, a digital signal processor, and/or a combination thereof, but the processor module is not limited thereto. The chipset 42 consists of a circuit on which bridges for the buses connecting the processor module(s) 41, the memory module 43, and the I/O controller 44, etc. and other components necessary for configuring the information communication terminal device 40 are integrated. The chipset 42 is controlled by, for example, the processor module(s) 41.

Figure 3:
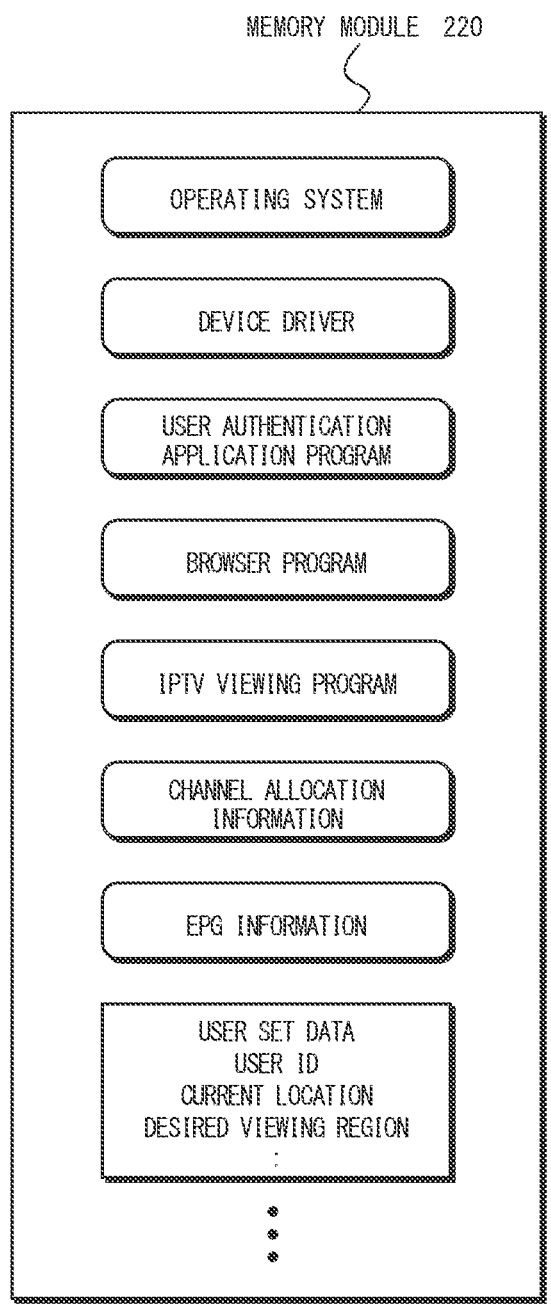
FIG. 3 is a conceptual diagram for an example of a stored content a memory module of an information communication terminal device according to an embodiment of the present invention.

The memory module 43 is typically a primary storage device comprising volatile memory (e.g., RAM), non-volatile memory (e.g., ROM, flash memory), and/or a combination thereof. As shown in FIG. 3, the memory module 43 typically holds all or part of the device drivers, operating system (OS) programs, one or more application programs, data, or the like, and is made available for use by the processor module(s) 41. In the present embodiment, the application programs include the IPTV viewing program that is executed on the information communication terminal 40. The data includes, for example, channel allocation information and the names of the setup regions. The IPTV viewing program may be pre-stored in the memory module 43 at the time of shipment of the information communication terminal device 40, or may be stored in the memory module 43 by being downloaded from a predetermined server computer on the communication network 10 using a communication interface 452. The IPTV viewing program of the present disclosure is configured to include a function of receiving, in parallel, each of the program data of the current channel and the program data of the channel that is inferred to be the switching destination and displaying each of the program content on the user interface screen, until the channel switching operation by the user via the user interface has been confirmed. The data includes, for example, channel allocation information, EPG information, and the names of the setup regions. The IPTV viewing program may be pre-stored in the memory module 43 at the time of shipment of the information communication terminal device 40, or may be stored in the memory module 43 by being downloaded from a predetermined server computer on the communication network 10 using a communication interface 452.

The I/O controller 44 is a circuit for controlling communication between various peripheral interfaces 45 (e.g., a I/O interface 451 and a communication interface 452). The I/O interface 451 controls, for example, the operation of external input/output devices such as a touch panel 461 and speaker 462, which configure the user interface. The I/O interface 451 may also include, for example, a serial controller or parallel controller, and may control the operation of external storage devices, other peripheral devices, and the like. The communication interface 452 is a circuit that allows for computer communication via the IP network 12. In the present disclosure, the communication interface 452 is primarily used for communication (e.g., streaming) with the delivery provider system 30 via the IP network 12.

The touch panel 461 is configured to include a display for displaying program content composed of videos, text, and images, and a transparent touch sensor sized to approximately match the size of the display. The touch panel 461 is an example of a device that achieves the user interface. Under control of the processor module(s) 41, the touch panel 461 displays various screens on the display and accepts interactive operations from the user. In the present disclosure, the touch panel 461 provides, under control of the processor module(s) 41, the user with screens relating to the program content and accepts interactive operations by the user, such as a touch operation and/or a swipe operation. Operation performed on the touch panel 461 may be performed by the user's finger, or by a stylus pen, or the like. In addition, operation buttons (not shown) may be provided to replace or complement the user operation with the touch panel 461. A normal display and a pointing device, such as a mouse, may be employed instead of the touch panel 461.

The speaker 462 outputs audio or sound based on audio signals generated by a sound processor (not shown). Under control of the processor module(s) 41, the speaker 462 outputs, for example, voice, music, sound effects, and the like synchronized with the videos in the received program content.

The GPS module 47 is a circuit for demodulating GPS signals received at a GPS antenna 471 into baseband signals. The information communication terminal device 40 may acquire location information by processing the digital signals corresponding to the GPS signals by the processor module(s) 41. The acquired location information is used, for example, for identifying the broadcasting region that covers a current location of the user.

Figure 4:
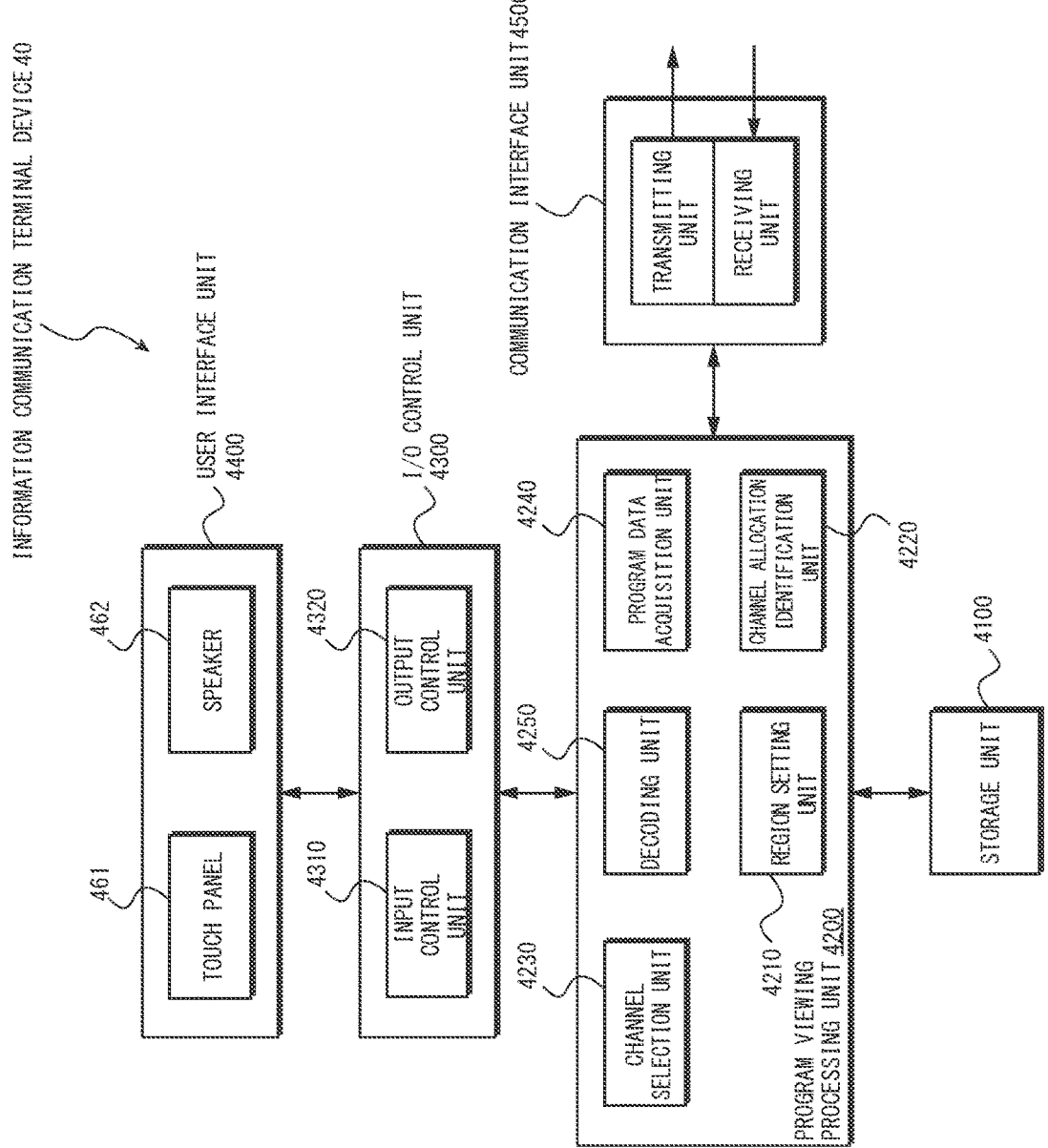
FIG. 4 is a diagram illustrating an example of a functional configuration of an information communication terminal device adapted for an IPTV service system according to an embodiment of the present invention.

FIG. 4 is a diagram illustrating an example of a functional configuration of the information communication terminal device adapted for the IPTV service system according to an embodiment of the present invention. The diagram shows those components that are of particular relevance to the present disclosure from among various components configuring the information communication terminal device 40. Such components may be achieved by the hardware resources described above or by any part thereof, or alternatively, for example, by the processor of the information communication terminal device 40 executing the application programs on the OS in cooperation with various hardware resources.

As shown in the diagram, the information communication terminal device 40 of the present embodiment is configured to include a storage unit 4100, a program viewing processing unit 4200, an I/O control unit 4300, a user interface unit 4400, and a communication interface unit 4500.

The storage unit 4100 stores the channel allocation information and also, according to the channel allocation information, stores one or more region names for identifying each broadcasting region where the user wishes to perform viewing. FIG. 5 is a diagram showing an example of a channel allocation information in the information communication terminal device according to an embodiment of the present invention. The channel allocation information is a table that defines channel allocations of broadcasting regions that are partitioned by the range reachable by the broadcast waves. The channel allocation information of the present embodiment includes network location information (e.g., URLs) of the delivery servers of the delivery provider systems 30 corresponding to the respective broadcasting regions. The channel allocation information is acquired, for example, from server computers of the broadcaster systems 20 and/or the delivery provider systems 30. For example, in the case of terrestrial digital broadcasting, the region names are the names of the broadcasting regions, such as "Sapporo," "Tokyo" (e.g., the region based on Tokyo Sky Tree), or "Kagoshima." The region name is set, for example, by a region setting unit 4210 via a user interactive operation, and is held in the storage unit 4100. The storage unit 4100 may also store EPG information. The EPG information is configured to include information on program scheduling for each broadcaster along the time axis. Further, the storage unit 4100 may provide a cache function for temporarily storing the program data acquired by a program data acquisition unit 4240.

Returning to FIG. 4, the program viewing processing unit 4200 performs, under control of the processor, processing for allowing the program content by the IPTV service to be viewed. The program viewing processing unit 4200 is configured to include, for example, the region setting unit 4210, a channel allocation identification unit 4220, a channel selection unit 4230, the program data acquisition unit 4240, and a decoding unit 4250.

Under user's interactive operations, the region setting unit 4210 sets a selected region name stored in the storage unit 4100 as the viewing-target broadcasting region (i.e., the broadcasting region where the user has performed viewing). The region name is selected from among several region names defined in the channel allocation information. For example, the region setting unit 4210 displays a list of broadcasting regions (region names) on the touch panel 461 in response to a user input operation and prompts the user to select a region name. Alternatively, the region setting unit 4210 may set a region name defined in the channel allocation information based on the location information acquired from the GPS module 47 under a user operation. The list of broadcasting regions (region names) may be configured hierarchically, such as, "Kanto"→"Tokyo"→"Tokyo SkyT." The region setting unit 4210 writes the region name selected by the user into the storage unit 4100. In the present disclosure, the region setting unit 4210 is an aspect of a region setting means.

The channel allocation identification unit 4220 identifies the channel allocation corresponding to the set broadcasting region. The channel allocation identification unit 4220 may identify the appropriate channel allocation from, for example, the channel allocation information. This allows the information communication terminal device 40 to let the user select one of the channels available for viewing in the set broadcasting region according to the identified channel allocation. In the present disclosure, the channel allocation identification unit 4220 is an aspect of a channel allocation identification means.

The channel selection unit 4230 selects one of the channels in the set broadcasting region according to the identified channel allocation under user's interactive operation. As one example, when a first operation (e.g., a touch operation) performed by the user on the touch panel 461 is accepted while the user is viewing a program content, the channel selection unit 4230 performs control such that a group of icons (hereinafter referred to as "channel icons") associated with selectable channel numbers or codes according to the current channel allocation is displayed on the screen of the touch panel 461 to accept a second operation (a channel switching operation) by the user. For example, the channel icons may be displayed superimposed on the program content being reproduced. In this state, when the channel selection unit 4230 accepts the second operation (e.g., a swipe operation) by the user, the channel selection unit 4230 identifies the number of at least one channel corresponding to the second operation and notifies this to the program data acquisition unit 4240.

The program data acquisition unit 4240 identifies, based on the channel allocation, the URL associated with the channel number selected by the channel selection unit 4230, and sends a request for delivery of the program data corresponding to the channel number, via the communication interface unit 4500, based on the identified URL. In response, the delivery provider system 30 starts streaming program data according to the RTSP. The program data streamed by the delivery provider system 30 is the program data of the program content according to the program scheduling table.

In addition, the program data acquisition unit 4240 acquires, via the communication interface unit 4500, the program data streamed from the delivery provider system 30 in response to a request for delivery of the program data. The program data acquisition unit 4240 passes the program data to the decoding unit 4250 so that program content based on the acquired program data is displayed on the screen.

In the present disclosure, if a channel switching operation is detected while receiving the program data (first program data) of the current channel, the program data acquisition unit 4240 may acquire or pre-fetch, in parallel with the acquisition of the first program data, the program data (second program data) corresponding to at least one channel that is inferred to be the switching destination. Such parallel program data acquisition by the program data acquisition unit 4240 may be performed, for example, until the channel switching operation is complete. It should be noted that the amount of program data received simultaneously in parallel may be set to be limited, for example, depending on the communication band and the processing capacity of the processor. In the present disclosure, the configuration of the program data acquisition unit 4240 or of the program data acquisition unit 4240 and the communication interface unit 4500 is an aspect of a program data acquisition means.

The decoding unit 4250 decodes the program data, thereby video data for displaying the video relating to the program content on the touch panel 461 and audio data synchronized with the video are generated. If multiple streams of program data are received in parallel, the decoding unit 4250 decodes each stream of program data and generates video data thereof. If the program data delivered from the delivery provider system 30 is scrambled, the decoding unit 4250 descrambles such program data. The generated video data and audio data are output to the user interface unit 4400 via the I/O control unit 4300.

The I/O control unit 4300 is configured to include, for example, an input control unit 4310 and an output control unit 4320. The input control unit 4310 calculates coordinates of the touched position in the screen based on the operation signals detected by the touch sensors of the touch panel 461, and enters them into the program viewing processing unit 4200. For example, an input processing unit (not shown) interprets the user's input operation from the position coordinates in the screen, and the program viewing processing unit 4200 performs processing in response to the input operation. The output control unit 4320 controls the display of the touch panel 461 such that the video of the program content based on the video data output from the decoding unit 4250 is displayed and it also controls the speaker 462 such that audio synchronized with the video is output. In the present disclosure, the output control unit 4320, which is controlled by the program viewing processing unit 4200, is an aspect of a display control means.

The user interface unit 4400 is configured to include, for example, the touch panel 461 and the speaker 462, and provides the user with a user interface. As described above, the user interface unit 4400 provides the user with a screen that displays various videos, images, text, etc. on the touch panel 461, and detects the user's interactive operation with the touch sensor and accepts the same. An example of user operations may include the first operation and the second operation following the first operation. The first operation may be, for example, the first touch or tap operation on the screen. The second operation may be an operation that involves, for example, movement in a predetermined direction within the screen (e.g., a swipe operation, a flick operation, or a scroll operation). In addition, for a single swipe operation, it may be viewed that a touch operation to the screen is the first operation and a movement operation within the screen is the second operation. The first operation and the second operation that follows the first operation should be considered as a series of operations. For example, if the screen is tapped as the first operation and then swiped as the second operation within a predetermined amount of time after the finger has been removed, then they are considered as a series of operations.

The communication interface unit 4500 is configured to include, for example, a transmitting unit 4510 and a receiving unit 4520. The transmitting unit 4510 sends out, for example, a request for delivery of the program data made by the program data acquisition unit 4240 onto the communication network 10 by converting the request into a predetermined communication data format. The receiving unit 4520 receives data addressed to itself on the communication network 10, converts the format of the data, and passes the converted data to the program viewing processing unit 4200.

Figure 6:
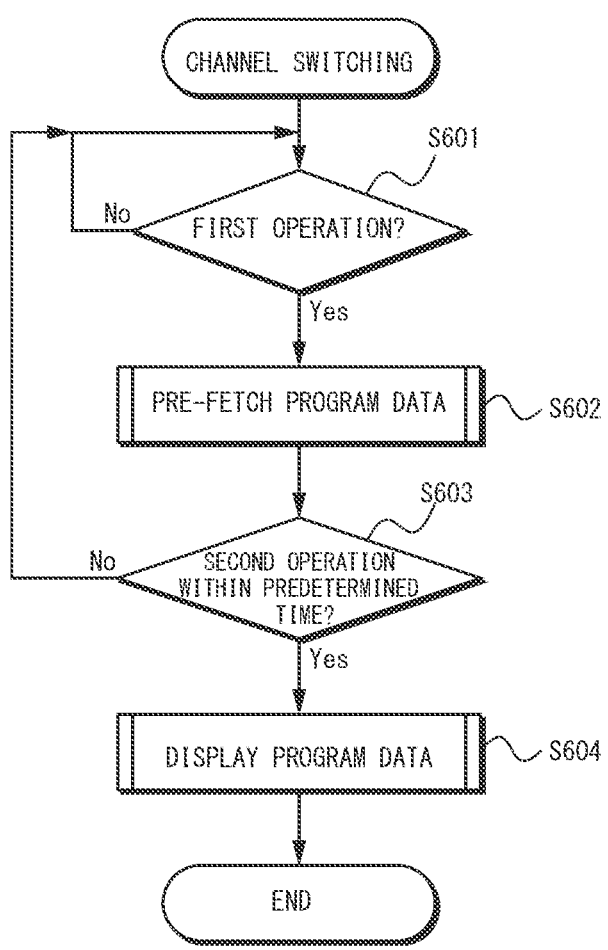
FIG. 6 is a flowchart for illustrating channel switching processing in an information communication terminal device according to an embodiment of the present invention.

FIG. 6 is a flowchart for illustrating channel switching processing in the information communication terminal device according to an embodiment of the present invention. Such processing may be achieved, for example, by the information communication terminal device 40 executing the IPTV viewing program, under control of the processor, in cooperation with various hardware resources.

Figure 7:
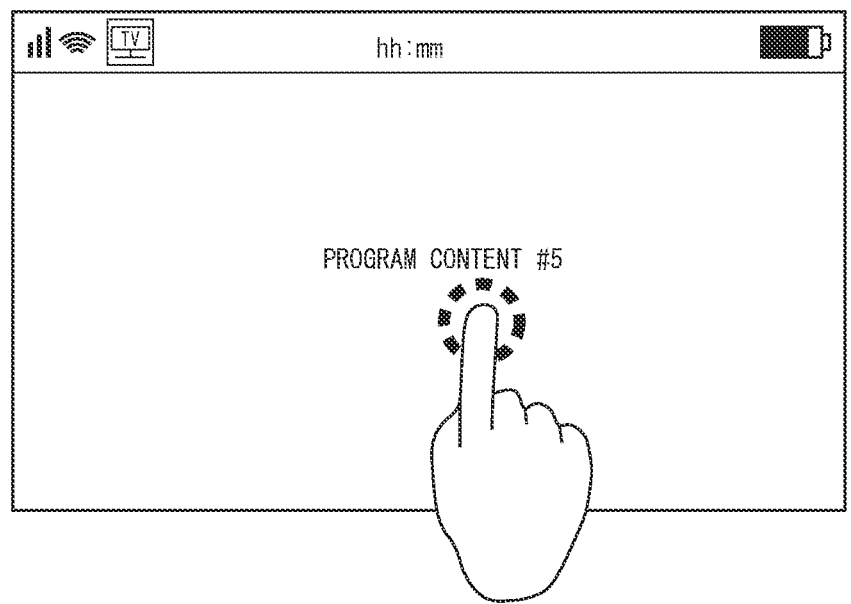
FIG. 7 is a diagram for illustrating an operation performed on a screen displayed on a user interface of an information communication terminal device according to an embodiment of the present invention.

As shown in FIG. 6, in a state where a channel switching operation by the user may be accepted, for example, while the program content is being displayed on the screen, the program viewing processing unit 4200 of the information communication terminal device 40 monitors whether an operation (the first operation) serving as a trigger for a channel switching operation has occurred (S601). For example, in a state where the program content corresponding to the currently-selected channel number is displayed on the screen of the user interface unit 4400, the user touches the screen, as shown in FIG. 7. When the user interface unit 4400 detects, for example, a touch operation by the user, the user interface unit 4400 notifies this to the program viewing processing unit 4200 via the I/O control unit 4300. Thereby, the program viewing processing unit 4200 becomes aware that the first operation has occurred.

If the program viewing processing unit 4200 determines that the first operation by the user has occurred (S601, Yes), the program viewing processing unit 4200 displays, for example, channel icons indicating selectable channels on the screen (see FIG. 9) and starts the program data pre-fetching processing described below (S602). The program viewing processing unit 4200 then determines whether a second operation has occurred within a predetermined time period (S603). The second operation is, for example, a swipe operation following the touch operation. If the program viewing processing unit 4200 determines that no second operation has occurred within the predetermined time period (S603, No), the program viewing processing unit 4200 returns to the processing in S601. For example, if the user does not perform any operation for a certain time period (e.g., one second or more) after the user touched the screen, the program viewing processing unit 4200 determines that the channel switching operation has been canceled and returns to monitoring the first operation.

On the other hand, if the program viewing processing unit 4200 determines that the second operation has occurred within the predetermined time period (S603, Yes), the program viewing processing unit 4200 starts display processing the program data as described below (S604) as it continues the channel switching processing.

Figure 8:
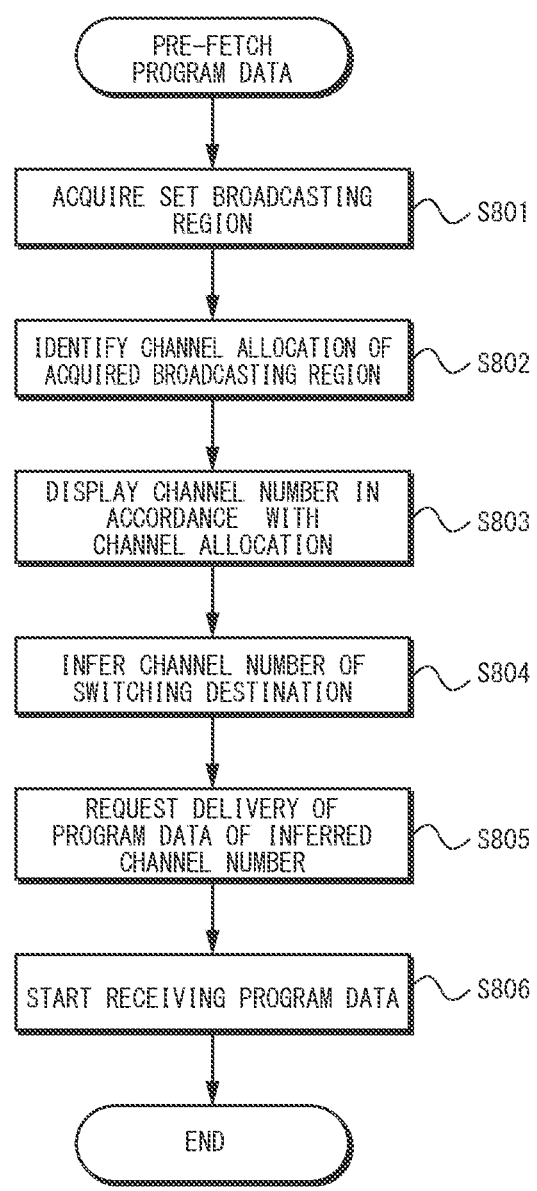
FIG. 8 is a flowchart for illustrating a pre-fetch processing of program data in an information communication terminal device according to an embodiment of the present invention.

FIG. 8 is a flowchart for illustrating a pre-fetch processing of program data in the information communication terminal device according to an embodiment of the present invention. FIG. 8 shows a flowchart detailing the processing of S602 in FIG. 6.

As shown in FIG. 8, the program viewing processing unit 4200 refers to the storage unit 4100 to acquire the set region name (broadcasting region) (S801). The program viewing processing unit 4200 then identifies the channel allocation corresponding to the acquired broadcasting region (S802). The channel allocation indicates, for example, what is referred to as allocation of frequency bands (channels) for respective broadcasting regions in conventional broadcast waves.

Figure 9:
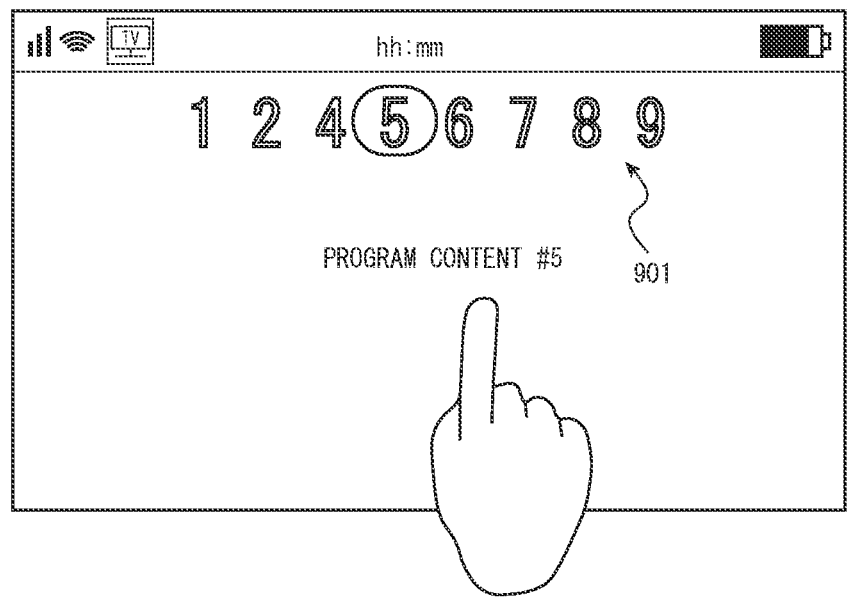
FIG. 9 is a diagram showing a channel icon example in a screen displayed on a user interface of an information communication terminal device according to an embodiment of the present invention.

Subsequently, the program viewing processing unit 4200 performs control such that the channel number (channel code) according to the identified channel allocation is displayed on the screen of the user interface unit 4400 (S803). The channel number is displayed on the screen, for example, as a channel icon. FIG. 9 is a diagram showing a channel icon example in the screen displayed on the user interface unit 4400 of the information communication terminal device 40 according to an embodiment of the present invention. In the diagram, multiple channel icons 901 laid out in the upper part of the screen are displayed in a superimposed manner on the program content #5 of the channel number "5" being reproduced.

Further, the program viewing processing unit 4200 infers the channel number of the switching destination based on the current channel number (S804). More specifically, the program viewing processing unit 4200 refers to the channel allocation to infer the channel number allocated next to the current channel number as the channel number of the switching destination. In terms of the example shown in FIG. 9, the program viewing processing unit 4200 infers the channel numbers "4" and "6" allocated next to the channel number "5" as the channel numbers of the switching destination.

Subsequently, based on the channel allocation, the program viewing processing unit 4200 identifies the URL associated with the inferred channel number of the switching destination, and sends a request, via the communication interface unit 4500, to deliver program data according to the identified URL (S805). In response, the delivery server of the delivery provider system 30, which is identified by the URL, starts streaming program data to the information communication terminal device 40, and the program viewing processing unit 4200 starts receiving the streamed program data (S806). In this example, the program viewing processing unit 4200 receives and acquires the program data corresponding to both the channel numbers "4" and "6."

In this way, upon receiving the first operation by the user, the information communication terminal device 40 infers the channel number of the switching destination and antecedently receives the program data corresponding to the channel number of the inferred switching destination to start caching the program data in the storage unit 4100 for display. Meanwhile, the information communication terminal device 40 displays the channel icons in the screen and accepts an input of the second operation by the user. This allows the information communication terminal device 40 to display the program data corresponding to the channel number of the switching destination on the screen before the user completes the channel switching operation.

Figure 10:
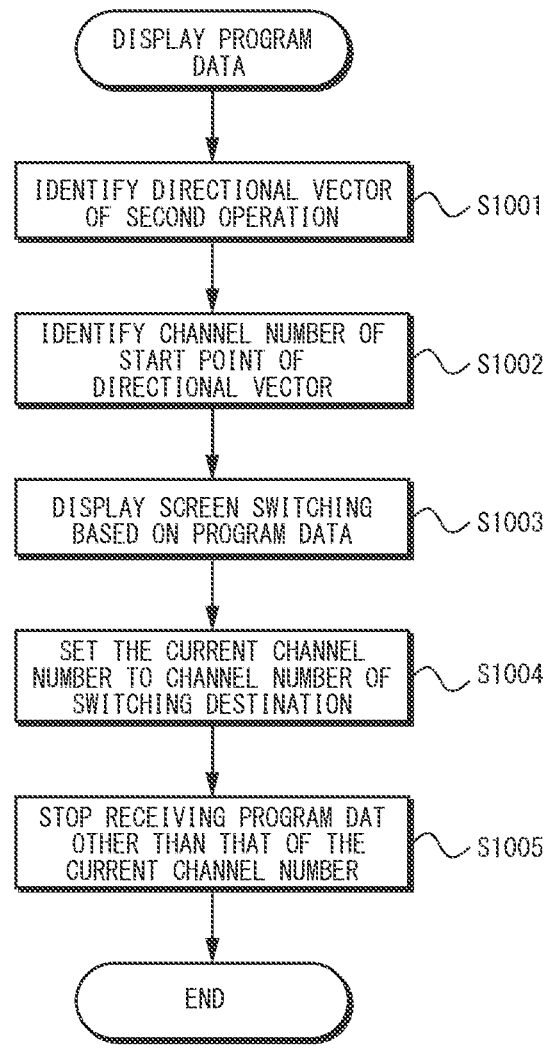
FIG. 10 is a flowchart for illustrating program data display processing in an information communication terminal device according to an embodiment of the present invention.

FIG. 10 is a flowchart for illustrating program data display processing in the information communication terminal device according to an embodiment of the present invention. More specifically, FIG. 10 shows a flowchart detailing the processing of S604 in FIG. 6.

As shown in FIG. 10, the program viewing processing unit 4200 identifies a directional vector of the second operation detected by the user interface unit 4400 (S1001). For example, if the second operation is a swipe operation, the program viewing processing unit 4200 identifies the directional vector of the swipe operation based on the start point and trajectory point of the swipe operation. The directional vector may also depend on the direction parallel to the row of channel icons displayed superimposed on the program content. Alternatively, the directional vector may be in two directions, the right-left direction and the top-bottom direction, relative to the screen displaying the program content. As another example, the program viewing processing unit 4200 may perform control, with respect to the screen displaying the program content, such that: the channel number is switched with the right-left direction (a first direction); and that the program content along the time axis is switched according to the EPG information with the top-bottom direction (a second direction orthogonal to the first direction).

Figure 11:
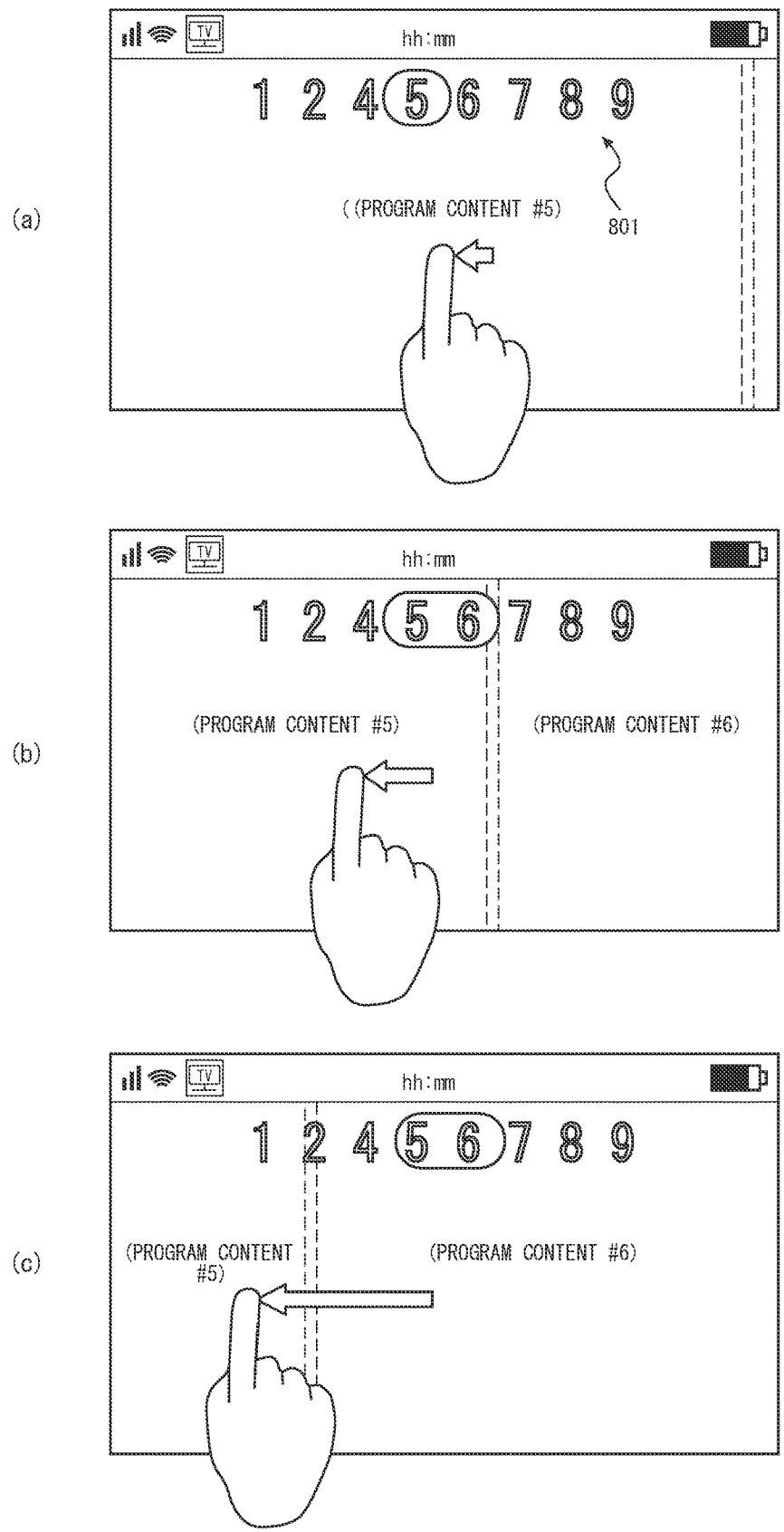
FIG. 11 is a diagram for illustrating an operation performed on a screen displayed on a user interface of an information communication terminal device according to an embodiment of the present invention.

When the directional vector is identified, the program viewing processing unit 4200 identifies a single channel number corresponding to the start point of the directional vector (S1002). For example, if the user starts a right-to-left swipe operation on the screen as shown in FIG. 11(*a*), the program viewing processing unit 4200 identifies the channel number "6" of the switching destination. At this stage, the channel number of the switch destination does not need to be confirmed unless the user releases the finger performing the swiping operation from the screen. The reason for this is because the user may switch the direction of the swipe operation, in which case the start point and the directional vector are switched.

Subsequently, the program viewing processing unit 4200 performs control such that the screen switching (transition) from the program content corresponding to the current (prior-to-switching) channel number to the program content corresponding to the channel number of the identified switching destination is displayed in a smooth or continuous manner (S1003). More specifically, the program viewing processing unit 4200 performs control such that: first program content is displayed in a first display area in the screen based on first program data received according to the current channel number; and that second program content is displayed in a second display area in the screen based on second program data, which the program viewing processing unit 4200 has started to receive according to the channel number of the switching destination. At this time, the program viewing processing unit 4200 may perform control such that the second program content is gradually displayed on the screen subjectively by, for example, varying the size of the second display area with respect to the first display area in conformity with the movement of the second operation (i.e., the movement of the finger) by the user. By way of example, as shown in FIGS. 11(*a*) to (*c*), the program viewing processing unit 4200 performs control such that the screen is scrolled by "sliding in" the program content of the switching destination, from an edge of the screen, such content being connected to the currently displayed program content, in conformity with the movement of the second operation by the user.

The program viewing processing unit 4200 sets the channel number of the program content of the switching destination to be the current channel number as the user completes the second operation (S1004). In addition, the program viewing processing unit 4200 stops the request to deliver the program data that no longer needs to be received, i.e., the program data of the channel number before the switching and the program data of other channel numbers that are not switched in the end, and stops receiving the program data (S1005). Thereby, the reception of unnecessary communication data (packets) may be avoided. In terms of the example shown in FIG. 11, if the user swipes from right to left in the screen, the program viewing processing unit 4200 stops receiving the program data of the channel numbers "5" and "4."

According to the present embodiments as described above, upon receiving the first operation by the user for switching channels, the information communication terminal device 40 infers at least one channel number of the switching destination, and sends a request for delivery of the program to the delivery provider system 30 associated with the inferred at least one channel number. By this, the information communication terminal device 40 receives the program data associated with the current channel number and also the program data associated with the channel number inferred as the switching destination. Then, upon receiving the second operation by the user following the first operation, the information communication terminal device 40 performs control such that the switching (transition) from the program content corresponding to the current (prior-to-switching) channel number to the program content corresponding to the channel number of the inferred switching destination is displayed in a smooth or continuous manner. This allows the information communication terminal device 40 to immediately display the program content of the channel number of the switching destination before the channel switching operation is completed, and the "no display" state of the screen may be avoided. Meanwhile, in addition to the program content currently being viewed, the user is allowed to antecedently view the program content of the channel number of the switching destination in association with intuitive operations.

Variation Example(s)

In the above-described embodiments, operation of the user is described on the assumption that the input operation is performed by one finger, but this is not a limitation. The user's operation may be, for example, a multi-input operation performed by two or more fingers. For example, if the first operation by the user detected by the user interface unit 4400 is a multi-touch operation performed on the screen by two fingers, the channel selection unit 4230 selects, as the channel number of the switching destination, a channel number by skipping over a channel number next to the current channel number. In other words, the channel numbers may be switched by skipping one channel or by fast-forwarding, such as from "1" to "4" to "6" or from "9" to "7" to "5." This allows the user to quickly reach the desired channel number. The number of channel skips is not limited to one, and it may be determined depending on the number of channels and the speed of finger movement. The program data acquisition unit 4240 requests delivery of program content according to link information associated with the channel number of the switching destination selected by the channel selection unit, and in response to such a request, starts receiving third program data delivered from the specific delivery server. Thereby, the program viewing processing unit 4200 performs control such that the program content before switching and the program content of the switching destination are displayed on the screen of the user interface unit 440 via the I/O control unit 4300.

The above-described respective embodiments are illustrations for describing the present invention, and are not intended to limit the present invention only to these embodiments. The present invention may be implemented in various forms, as long as they do not deviate from the gist of the invention.

For example, the steps, actions, or functions in the method disclosed in the present specification may be implemented in parallel or in different order, unless there is no inconsistency in the results. The described steps, actions, and functions are provided as examples only and some of the steps, actions, and functions may be omitted and may be performed as one entity by being combining with each other, and other steps, actions, or functions may be added, to the extent that they do not deviate from the gist of the invention.

In addition, various embodiments are disclosed in the present specification, but specific features (technical matters) in one embodiment may be added to other embodiments with appropriate improvements, or may be replaced with specific features in such other embodiments, and such embodiments are also included in the gist of the present invention.

REFERENCES

1 . . . IPTV service system 1
10 . . . Communication network
12 . . . IP network
14 . . . Mobile communication network
16 . . . Gateway
18 . . . Dedicated line
20 . . . Broadcaster system
30 . . . Distribution provider system
40 . . . Information communication terminal device
   41 . . . Processor module
   42 . . . Chipset
   43 . . . Memory module
   44 . . . I/O controller
   45 . . . Peripheral interface
      451 . . . I/O interface
      452 . . . Communication interface
   46 . . . I/O devices
      461 . . . Touch panel
      462 . . . Speaker
   47 . . . GPS module
   4100 . . . Storage unit
   4200 . . . Program viewing processing unit
      4210 . . . Region settings unit
      4220 . . . Channel allocation identification unit
      4230 . . . Channel selection unit
      4240 . . . Program data acquisition unit
      4250 . . . Decoding unit
   4300 . . . I/O control unit
      4310 . . . Input control unit
      4320 . . . Output control unit
   4400 . . . User interface unit
   4500 . . . Communication interface unit

The invention claimed is:

1. An information communication terminal device adapted for an IPTV service that delivers program data from one of a plurality of delivery servers via a communication network, comprising:

a channel selection unit which selects a channel number according to channel allocation which defines allocation of channels corresponding to broadcasting regions;

a program data acquisition unit which requests a specific delivery server to deliver program data according to link information associated with the selected channel number and acquires the program data delivered from the specific delivery server in response to the request; and a display control unit which performs control such that program content is displayed on a screen based on the received program data, wherein in response to a first operation by a user with respect to the screen, the channel selection unit infers channel numbers of a first switching destination and a second switching destination that are adjacent to the current channel number according to the channel allocation, the program data acquisition unit acquires first program data according to link information associated with the current channel number, while the program data acquisition unit starts acquiring first switching destination program data according to link information associated with the channel number of the first switching destination and starts acquiring second switching destination program data according to link information associated with the channel number of the second switching destination, in response to a second operation by the user with respect to the screen following the first operation, the channel selection unit determines one of the inferred channel numbers of the first switching destination and the second first switching destination, the program data acquisition unit continually acquires, as second program data, the switching destination program data corresponding to the determined one of the channel numbers of the switching destinations, while stopping acquiring the switching destination program data corresponding to one of the channel numbers of the switching destinations that is not determined by the channel selection unit, and the display control unit performs control such that first program content based on the first program data and second program content based on the second program data are displayed on the screen.

2. The information communication terminal device according to claim 1, wherein the first operation is a touch operation or a tap operation by the user on the screen, and the second operation is an operation with movement in a predetermined direction within the screen.

3. The information communication terminal device according to claim 1, wherein the second operation is at least one of a swipe operation, a flick operation, or a scroll operation, with respect to the screen.

4. The information communication terminal device according to claim 1, wherein the display control unit performs control such that switching from the first program content to the second program content is displayed in a smooth manner on the screen according to the movement in the second operation.

5. The information communication terminal device according to claim 4, wherein the display control unit performs the switching from the first program content to the second program content in the screen by screen scrolling in the predetermined direction.

6. The information communication terminal device according to claim 1, wherein, if the first operation is a multi-touch operation on the screen, the channel selection unit determines, in response to the multi-touch operation, a channel number of a second switching destination different from the channel number of the first switching destination according to the channel allocation.

7. The information communication terminal device according to claim 6, wherein,
in response to the second operation, subsequent to the multi-touch operation, with respect to the screen, the program data acquisition unit requests delivery of third program data according to link information associated with the determined channel number of the second switching destination, and starts acquiring the third program data delivered from the specific delivery server in response to the request, and
the display control unit performs control such that the first program content based on the first program data and third program content based on the third program data are displayed on the screen in association with the reception of the third program data.

8. A method for controlling display in an information communication terminal device adapted for an IPTV service that delivers program data from one of a plurality of delivery servers via a communication network, the method comprising:
selecting a channel number according to channel allocation which defines allocation of channels corresponding to broadcasting regions;
requesting a specific delivery server to deliver program data according to link information associated with the selected channel number;
in response to the request, acquiring the program data delivered from the specific delivery server; and
performing display control such that program content is displayed on a screen based on the acquired program data, wherein
selecting the channel number includes, in response to a first operation by a user with respect to the screen, inferring channel numbers of a first switching destination and a second switching destination that are adjacent to the current channel number according to the channel allocation,
acquiring the program data includes acquiring first program data according to link information associated with the current channel number, while acquiring first switching destination program data according to link information associated with the channel number of the first switching destination and starts acquiring second switching destination program data according to link information associated with the channel number of the second switching destination,
in response to a second operation by the user with respect to the screen following the first operation, determining one of the inferred channel numbers of the first switching destination and the second first switching destination,
continually acquiring, as second program data, the switching destination program data corresponding to the determined one of the channel numbers of the switching destinations, while stopping acquiring the switching destination program data corresponding to one of the channel numbers of the switching destinations that is not determined by the channel selection unit, and
performing display control includes performing control such that first program content based on the first program data and second program content based on the second program data are displayed on the screen.

9. A product comprising a non-transitory computer-readable medium storing a computer program for achieving a method for displaying program content based on program data delivered by one of a plurality of delivery servers via a communication network, wherein the program causes, by execution under control of a computing device, the computing device to perform to:
select a channel number according to channel allocation which defines allocation of channels corresponding to broadcasting regions;
request a specific delivery server to deliver program data according to link information associated with the selected channel number;
in response to the request, acquire the program data delivered from the specific delivery server; and
perform display control such that program content is displayed on a screen based on the acquired program data, wherein
selecting the channel number includes, in response to a first operation by a user with respect to the screen, inferring channel numbers of a first switching destination and a second switching destination that are adjacent to the current channel number according to the channel allocation,
acquiring the program data includes acquiring first program data according to link information associated with the current channel number, while acquiring first switching destination program data according to link information associated with the channel number of the first switching destination and starts acquiring second switching destination program data according to link information associated with the channel number of the second switching destination, in response to a second operation by the user with respect to the screen following the first operation, determining one of the inferred channel numbers of the first switching destination and the second first switching destination, continually acquiring, as second program data, the switching destination program data corresponding to the determined one of the channel numbers of the switching destinations, while stopping acquiring the switching destination program data corresponding to one of the channel numbers of the switching destinations that is not determined by the channel selection unit, and performing display control includes performing control such that first program content based on the first program data and second program content based on the second program data are displayed on the screen.

* * * * *